United States Patent [19]

Scaringe et al.

[11] Patent Number: 5,390,659
[45] Date of Patent: Feb. 21, 1995

[54] FLAMESLESS HEATER PAD AND TRAY SYSTEMS

[75] Inventors: Robert P. Scaringe, Rockledge; Lawrence R. Grzyll, Merritt Island, both of Fla.

[73] Assignee: Mainstream Engineering Corporation, Rockledge, Fla.

[21] Appl. No.: 170,696

[22] Filed: Dec. 21, 1993

[51] Int. Cl.⁶ .................................... F24J 1/00
[52] U.S. Cl. .................................... 126/263 R
[58] Field of Search .................................... 126/263

[56] References Cited

U.S. PATENT DOCUMENTS

| | | | |
|---|---|---|---|
| 818,092 | 4/1906 | Jewett | 126/263 |
| 3,871,357 | 3/1975 | Grosso et al. | 126/263 |
| 5,117,809 | 6/1992 | Scaringe et al. | |
| 5,220,909 | 6/1993 | Pickard et al. | 126/263 |
| 5,295,475 | 3/1994 | Kaneko | 126/263 |

*Primary Examiner*—Carroll B. Dority
*Attorney, Agent, or Firm*—Evenson, McKeown, Edwards & Lenahan

[57] ABSTRACT

A flameless heater system has at least one tray which is configured to hold a water-actuatable heater pad to produce an exothermic heating reaction for one or more pouches containing food or a beverage and a water supply apparatus associated with the tray. This water supply apparatus is in the form of a trough sized to receive an amount of water sufficient to produce, when applied to the heater pad, adequate to heat contents of the at least one meal pouch and arranged so as to produce the reaction by a slight tilting of the tray without spilling water. The tray is provided with device to securely retain the pouch or pouches and a bottom portion with a raised land portion to receive a complementary lip portion of the heater pad. The water supply apparatus can also be arranged at a side of the tray with a first portion configured to receive a filling tube and a second portion associated with the first portion for metering water into the bottom of the tray. Several trays can be arranged one above the other to heat a variety of foods and/or beverages at the same time.

9 Claims, 5 Drawing Sheets

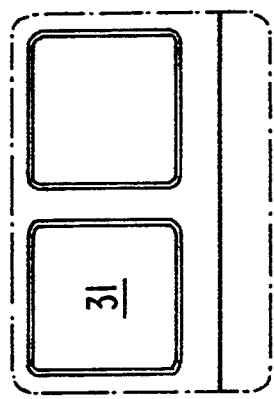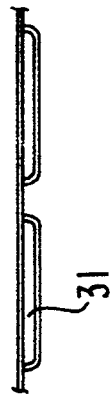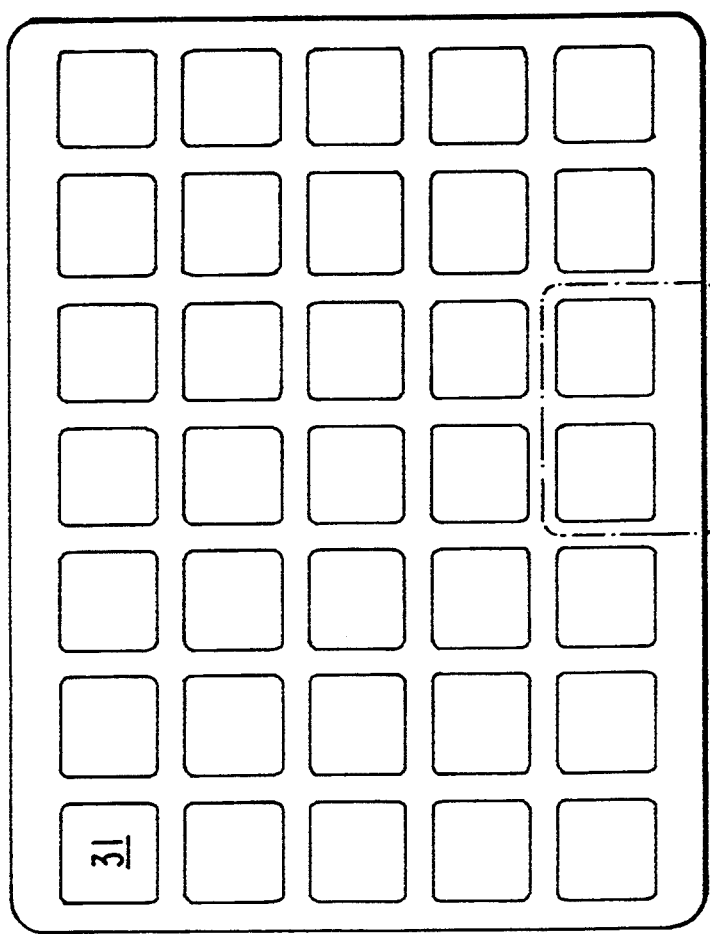
FIG. 9
FIG. 10
FIG. 7
FIG. 8

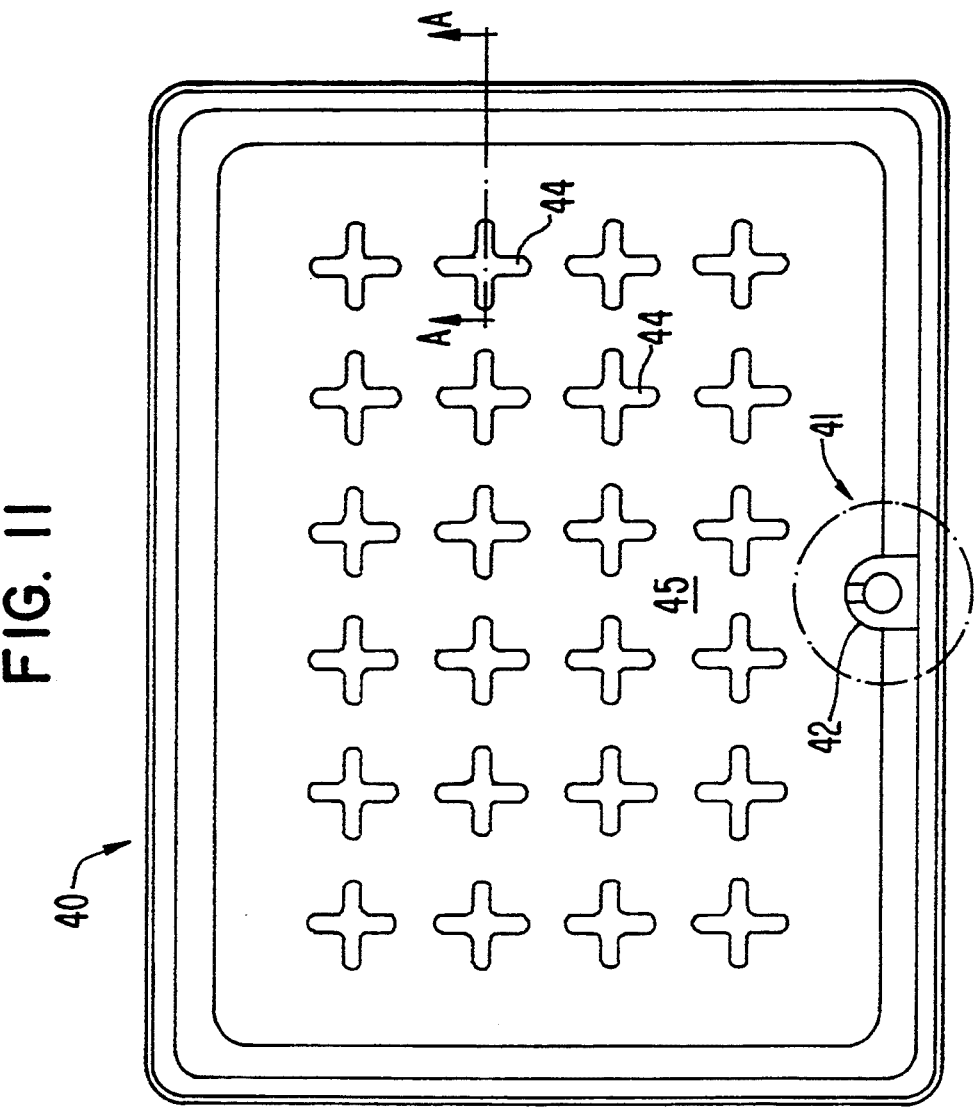
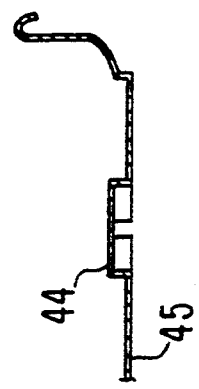
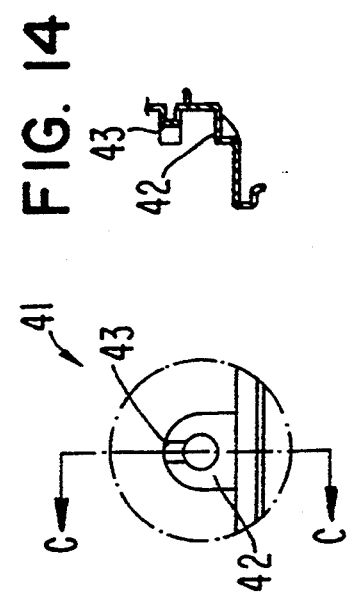
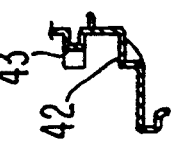

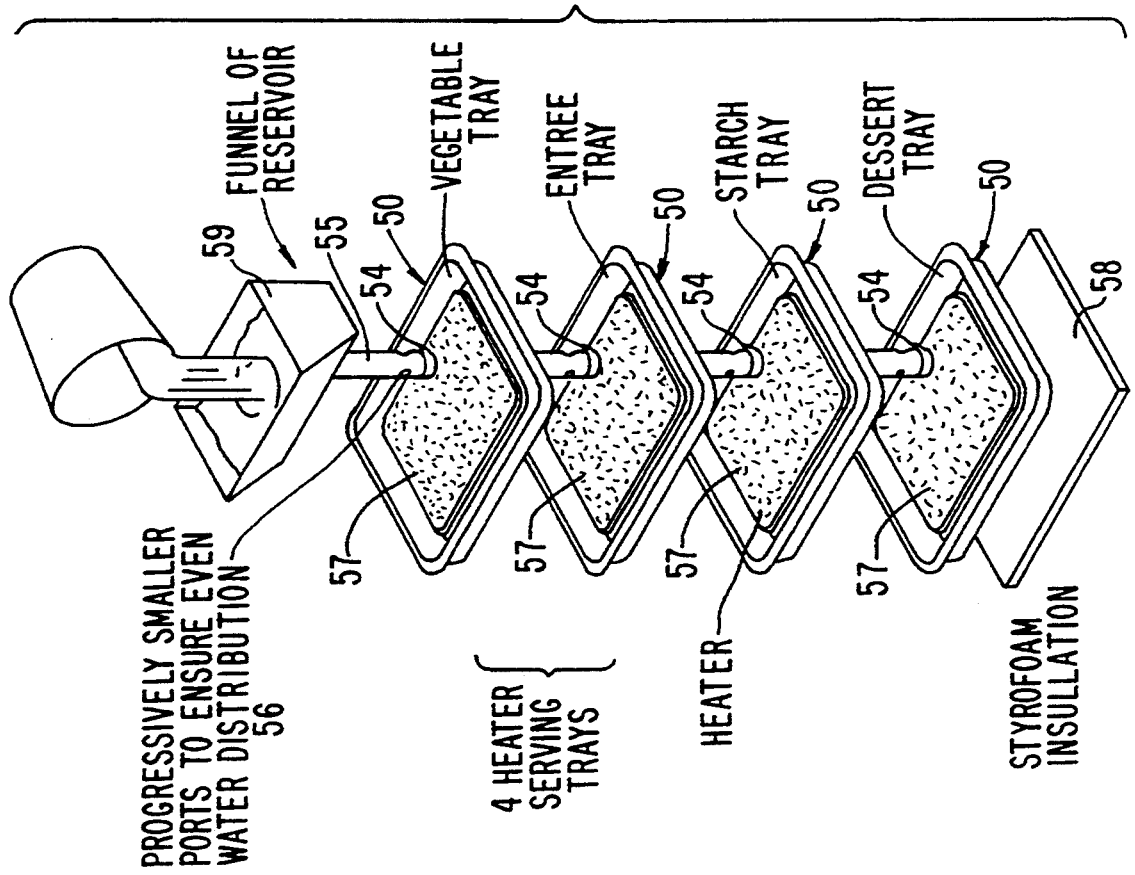
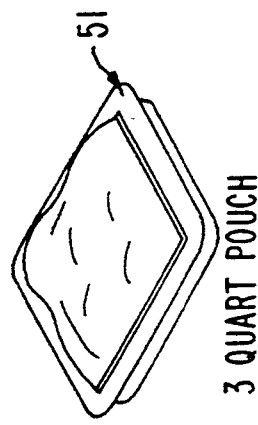
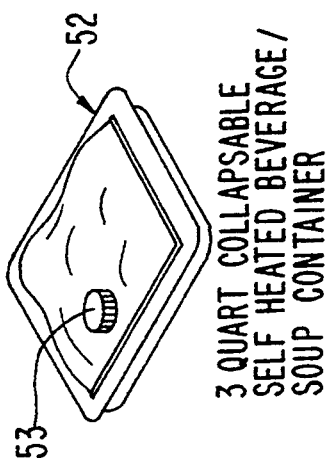

FLAMELESS HEATER PAD AND TRAY SYSTEMS

The subject matter of the present invention was developed under contract with the U.S. Government.

BACKGROUND AND SUMMARY OF THE INVENTION

The present invention relates to further improvements in food handling as described in U.S. Pat. No. 5,117,809, the disclosure of which is incorporated by reference herein. In particular, the present invention relates, on one hand, to a MRE-type flameless heater for accommodating a single commercial shelf-stable meal for use, e.g., by campers, hikers and the like and, on the other hand, to a heater for accommodating a group meal tray for, e.g. disaster relief, military applications, group camping (scouting and the like) and other instances where a group of people do not have access to standard food heating equipment, both of which heaters avoid the problems of product uniformity and low production rates.

Generally speaking, the two types of food heater embodiments in accordance with the present invention comprise the tray for holding the meal and the heater pad constructed in accordance with the principles described in U.S. Pat. No. 5,117,809. The single meal embodiment utilizes a commercial shelf-stable meal, e.g. a 10 ounce meal of the type sold by Land-O-Frost, or meals of other suppliers such as Hormel.

BRIEF DESCRIPTION OF THE DRAWINGS

These and other objects, features and advantages of the present invention will become more apparent from the following detailed description thereof when taken in conjunction with the accompanying drawings wherein:

FIGS. 7 and 8 are, respectively, top plan and side views of a heater pad for a group meal heater;

FIGS. 9 and 10 are, respectively, top plan and side views of a section of the group meal heater pad in the area bounded by dot-dash lines in FIG. 6;

FIG. 11 is a top plan view of one embodiment of the group meal heater tray for the heater pad of FIGS. 7-10;

FIG. 12 is a cross-sectional view along line A—A of FIG. 10;

FIG. 13 is an isolated view of the water metering system bounded by the dashed circle in FIG. 10;

FIG. 14 is a cross-sectional view along line C—C of FIG. 13;

FIGS. 15a and 15b are different embodiments of group meal containers, one being a three quart pouch for food and the other being a beverage or soup container; and FIG. 16 is a group meal heater tray system consisting of stackable trays which can hold different food groups.

DETAILED DESCRIPTION OF THE DRAWINGS

Figure 1:
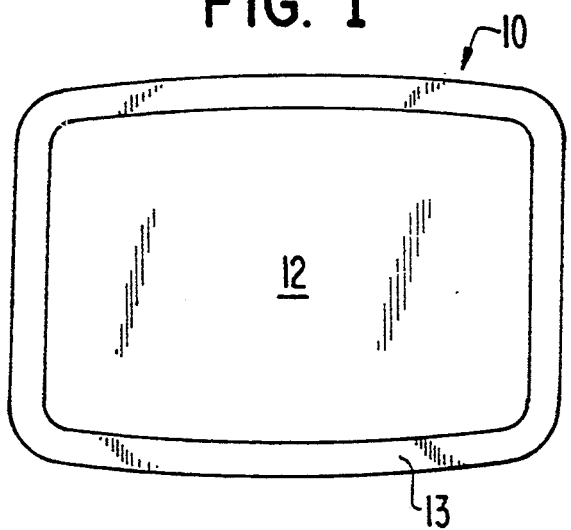
FIGS. 1 and 2 are, respectively, top plan side views of the heater pad constructed in accordance with the principles described in U.S. Pat. No. 5,117,809.
Figure 2:
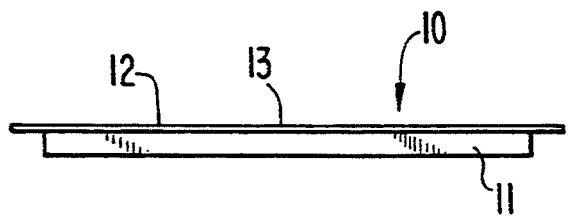
Figure 3:
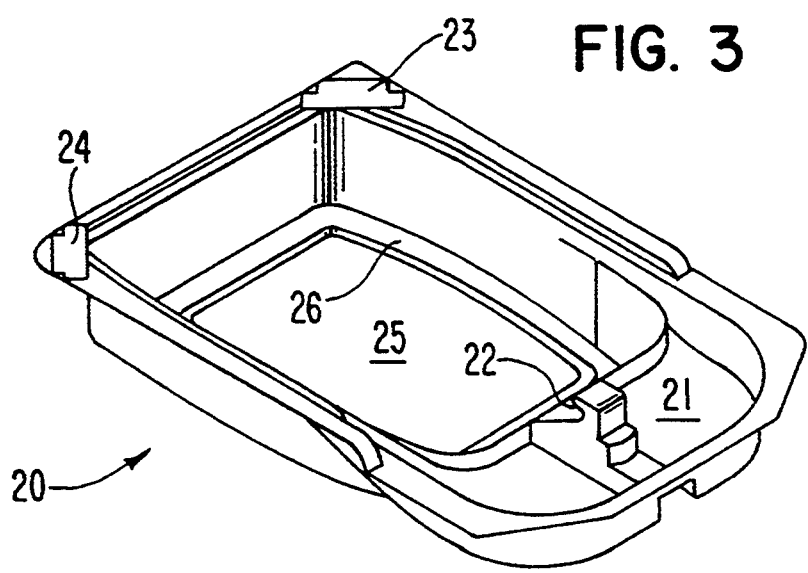
FIG. 3 is a perspective view of a single meal tray used with the heater pad shown in FIGS. 1 and 2.

The heater pad used in the hereinafter described meal tray embodiment of FIGS. 3–6 is designated by the numeral 10 in FIGS. 1 and 2, and its general construction and operating principles are fully described in U.S. Pat. No. 5,117,809. Accordingly, details of the heater pad's construction and operation can be dispensed with here except to note that the heater pad 10 is of approximately rectangular configuration of approximately 4½×3 inches and relatively thin (e.g. ¼ inch), as more clearly seen in FIG. 2, to fit easily but without undue play in the bottom 25 of a meal tray 20 (e.g., FIGS. 3 and 4) and contacts the bottom of a commercial meal (not shown) placed thereupon. The pad 10 contains a water-activatable, exothermic chemical material loosely placed in a plastic bottom 11 having a lip portion 13 extending circumferentially around the pad 10, and covered by a porous, wettable material 12. Of course, it should be understood that the configuration of the heater pad can be changed to accommodate almost any type of commercially available meal and/or to fit within any tray, as will be understood particularly with regard to the embodiments of FIGS. 7 and 16.

Figure 5:
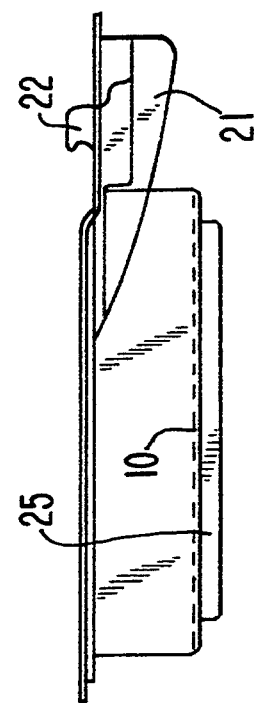
FIGS. 4 through 6 are, respectively, top plan, side and end views of the meal tray substantially as shown in FIG. 3 and utilized in connection with the heater pad of FIGS. 1 and 2 for a single commercial shelf-stable meal.
Figure 6:
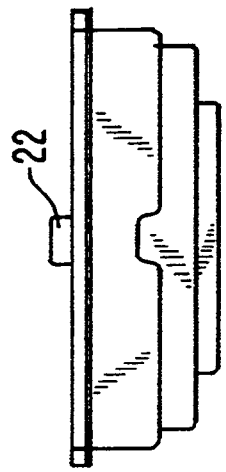
Figure 4:
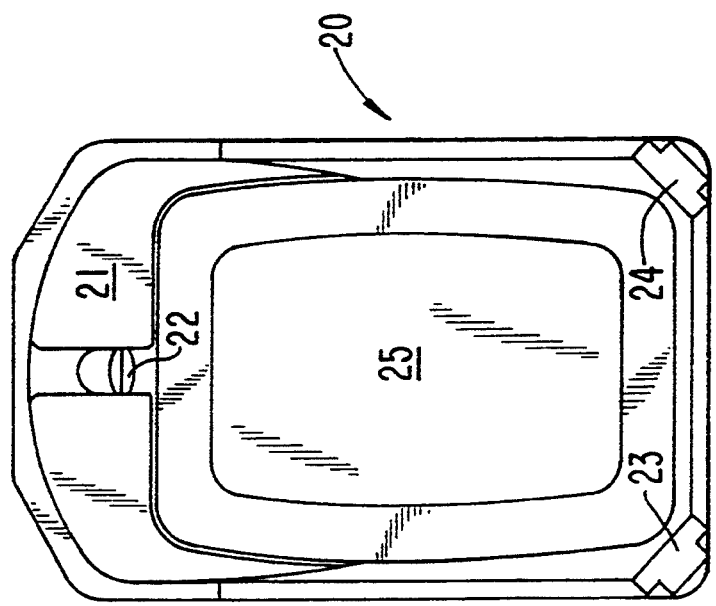

The tray 20 for holding the heater pad 10 has, in addition to the cavity 25 sized and configured with a raised land portion 26 to receive the heater pad 10 easily but relatively snugly for providing energy to heat food as well as a commercially available, off-the-shelf meal (not shown), a trough 21 so as to act as a metering device to provide and deliver the appropriate amount of water for the heater pad 10. The meal tray 20 can be made, for example, of a rigid polymeric material (e.g., polystyrene, polypropylene, polyethylene, polyester, crystallized polyester, etc.) formed to adequately contain the meal heater pad 10, and water metering system 21. The heater pad 10 is placed, with its porous material 12 up, on the bottom of the cavity 25 with the lip 13 supported on the land 26 and the meal commercial pouch (not shown) is placed on top of the porous cover 12. The heater pad is of sufficient dimensions to adequately cover most, or all, of the bottom surface of the meal as seen in FIG. 5. The meal tray 20 is sized to hold the commercial meal pouch securely in place by snapping the meal pouch onto the tray using a friction fitting or form locking corner flanges 22, 23, and a similar flange 24 in the middle of the trough 21. These flanges can be arranged to contact the meal in several places, such as two corners of the meal tray, or can be a continuous ridge (not shown) to completely contact the meal tray perimeter. The tray has a water metering system constituted by a cavity or trough 21 formed on one side of the meal tray 20 and sized to accommodate the appropriate amount of water for the heater pad 10. Metering of the water is performed in a simple manner by adding water to the level of a measuring trough 21. The water trough 21 is angled, as most clearly seen in FIG. 5, so that water is delivered to the heater pad 10 by simply tilting the meal tray slightly so the water flows from the water trough 21, around and under the meal pouch, into contact with the porous material 12 of the heater pad 10 for activation of the chemicals therein. The angle in the water trough is such that the tray 20 does not have to be tipped to such a great angle that water is likely to flow out of the tray 20 on the opposite side of the water trough 21.

The group meal heater pad is designated generally by the numeral 30 in FIGS. 7-10 and serves the same general purposes as the commercial meal pad 10 described above. The heater pad is configured with multiple pockets 31 similar to the heater pad shown in FIG. 1 of U.S. Pat. No. 5,117,809 and is placed on the bottom of the heater tray described hereinbelow. The pad 30 is sized to adequately cover most or all of the bottom surface of a meal tray containing the group meal.

One embodiment of a group meal tray is designated generally by the numeral 40 in FIG. 11. For instance, the group meal heater tray 40 is made of a rigid polymeric material (polystyrene, polypropylene, polyethylene, polyester, crystallized polyester, and the like) and is formed adequately to contain the meal (not shown), the heater pad 30, and water delivery system 41. By way of example only, the dimensions of the group meal tray 40 are 13 inches long, 10 inches wide, and 1.5 inches deep. The water delivery system 41 consists of a raised circular flange or reservoir 42 (see, in particular, FIGS. 13 and 14) on one side of the group meal tray 40 that can accommodate a conventional fill tube (not shown) for water delivery. This circular flange has a shallow ridge 43 at one location which allows water to flow from the fill tube over the ridge 43 and onto the heater pad 30.

The tray 40 shown in FIG. 11 has a plurality of cross-shaped projections 44 (FIG. 12) extending from a bottom surface 45. These projections 44 are arranged uniformly over the bottom 45 of the heater tray 40 and maintain the multi-pocket heater pad 30 in a fixed position above the bottom, with the porous material side of the pad facing the bottom 45, then with the group meal (not shown) being placed on top of the pad 30. Water is then poured into the small cavity 42 on the side of the tray 40, and from there the water flows into the space between the meal and the heater pad 30 into the water permeable material to initiate the exothermic heating reaction and provide flameless heating in the manner fully described in U.S. Pat. No. 5,117,809 for the group meal package located in the tray in contact with the top of the heater pad.

As shown in FIG. 16, the group meal heater trays can also be configured such that multiple sets of trays and a variety of (FIGS. 15(a) and 15(b)) meals and beverages are stackable vertically, with a water tube passing vertically through the trays for simultaneous addition of water to each of the heater trays.

FIG. 15(a) shows one form of group meal in the form of a 3-quart pouch of food 51, whereas FIG. 15(b) shows one form of beverage or soup container 52 with a removable pouring/filling spout 53. The trays 50 (FIG. 16) are somewhat differently configured from the group meal tray 40 (FIG. 11) insofar as the former has a pass-through aperture 54 for tightly receiving a filling tube 55 having a length sufficient to extend through a number of trays 50 (e.g. four trays as shown in FIG. 16), one of which is, by way of illustration, a vegetable tray, another of which can be the entree tray, the third of which can be a starch group tray (rice or potatoes) and the fourth of which can be a dessert tray. The filling tube 55 is provided with ports with progressively smaller ports 56 to ensure even water distribution to the trays 50 and to the heater pads 57 placed therein. A plate 58 made of styrofoam or other insulating material is placed beneath the lowest tray 50, and a funnel or reservoir 59 is attached to the top of the filling tube 55 to supply water to each of the trays 50 through the progressively smaller (in the descending direction) ports 56. The pouches 51, 52, etc. can be then placed into the trays 50 to heat the food therein. The trays 50 can be provided with form-locking or friction device (not shown) to snap the meals securely in place within the trays in a manner similar to the single meal tray 20 shown in FIG. 3.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. In a flameless heater, comprising a tray containing a compartment configured to hold a water-actuatable heater pad to produce an exothermic heating reaction and a pouch containing food or a beverage, a trough located adjacent said compartment and sized to receive an amount of water sufficient to produce, when applied to the heater pad, adequate heat for heating contents of the pouch and configured to have a greater depth at a side remote from said compartment than at a side adjacent said compartment and with a bottom sloping upwardly from the greater dept toward the side adjacent said compartment arranged so as to produce the reaction by slight tilting of the tray without spilling water.

2. The flameless heater according to claim 1, wherein means are provided for securely retaining the meal pouch within the tray.

3. The flameless heater according to claim 1, wherein a bottom portion of the tray has a raised land portion to receive a complementary lip portion of the heater pad.

4. In a flameless heater system for a group of pouches whose contents include food or beverages to be heated, comprising a plurality of trays each sized to hold a water-actuatable heater pad for producing an exothermic heating reaction, and means for distributing water approximately evenly to each of the trays spaced one above another.

5. The flameless heater system according to claim 4, wherein an insulating member is placed below the lowermost of the trays.

6. The flameless heater system according to claim 4, wherein the heater pad comprises a member having a plurality of pouches for holding a heater mixture and a porous wettable cover material covering the pouches.

7. In a flameless heater, comprising a tray configured to hold at a bottom portion thereof a water-actuatable heater pad with a porous wettable cover material to produce an exothermic heating reaction for contents of a pouch, and a water supply apparatus arranged at a side of the tray and having a raised portion with a opening configured to receive a filling tube and a shallow ridge in said raised portion for metering water into the bottom of the tray.

8. The flameless heater according to claim 7, wherein projections are distributed over the bottom portion of the tray to provide a space between the bottom portion and the heater pad for the ingress of water and the wetting of the porous cover material of the heater pad.

9. The flameless heater according to claim 7, wherein the tray and heater pad are sized to heat pouches having food contents sufficient for a group of people.

* * * * *